US012644542B2

(12) United States Patent
Okawa et al.

(10) Patent No.: US 12,644,542 B2
(45) Date of Patent: Jun. 2, 2026

(54) PIPE JOINT

(71) Applicant: NIPPON PILLAR PACKING CO., LTD., Osaka (JP)

(72) Inventors: Yohei Okawa, Osaka (JP); Ayumi Kurosaki, Osaka (JP); Shingo Higuchi, Osaka (JP); Kazukiyo Teshima, Osaka (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

(21) Appl. No.: 18/971,620

(22) Filed: Dec. 6, 2024

(65) Prior Publication Data

US 2025/0092968 A1 Mar. 20, 2025

Related U.S. Application Data

(62) Division of application No. 18/258,813, filed as application No. PCT/JP2021/036665 on Oct. 4, 2021, now abandoned.

(30) Foreign Application Priority Data

Feb. 18, 2021 (JP) ................................. 2021-024153

(51) Int. Cl.
F16L 13/16 (2006.01)
F16L 19/04 (2006.01)
(Continued)

(52) U.S. Cl.
CPC ........... F16L 13/165 (2013.01); F16L 19/041 (2013.01); F16L 33/223 (2013.01); F16L 47/041 (2019.08)

(58) Field of Classification Search
CPC ..... F16L 19/028; F16L 19/0283; F16L 19/04; F16L 19/041; F16L 33/223; F16L 47/04; F16L 47/041
See application file for complete search history.

(56) References Cited

U.S. PATENT DOCUMENTS

| | | | | |
|---|---|---|---|---|
| 821,564 | A | * | 5/1906 | Wilks ...................... F16L 19/04 403/279 |
| 1,943,717 | A | | 1/1934 | Barnes |

(Continued)

FOREIGN PATENT DOCUMENTS

| | | |
|---|---|---|
| CN | 106687733 A | 5/2017 |
| CN | 208859127 U | 5/2019 |

(Continued)

OTHER PUBLICATIONS

International Search Report issued in corresponding International Application No. PCT/JP2021/036665 issued Dec. 7, 2021 (7 pages).

(Continued)

*Primary Examiner* — Matthew Troutman
*Assistant Examiner* — Alexander T Rufrano
(74) *Attorney, Agent, or Firm* — Osha Bergman Watanabe & Burton LLP

(57) ABSTRACT

A pipe joint includes: an inner ring having a bulge portion to be press-fitted into an end portion of the tube; a joint body having an inner circumference into which an end portion of the inner ring is to be press-fitted, and having an external thread portion on an outer circumference thereof; and a union nut having an internal thread portion to be tightened to the external thread portion, and configured to press the end portion of the tube when the internal thread portion is tightened to the external thread portion. The bulge portion has a tapered portion configured to generate a surface pressure between the tube and the tapered portion by pressing by the union nut. An outer circumferential surface of the tapered portion has a concave surface portion formed in a concave surface shape in an axial cross-sectional view.

1 Claim, 9 Drawing Sheets

(AXIAL DIRECTION)
ONE SIDE ◄------------------------► OTHER SIDE

(51) Int. Cl.
F16L 33/22      (2006.01)
F16L 47/04      (2006.01)

(56)         References Cited

U.S. PATENT DOCUMENTS

| | | | |
|---|---|---|---|
| 2,863,678 | A | 12/1958 | Gordon et al. |
| 3,294,426 | A | 12/1966 | Lyon |
| 5,286,072 | A | 2/1994 | Ruppert et al. |
| 5,388,871 | A | 2/1995 | Saitoh |
| 6,776,440 | B2 | 8/2004 | Nishio |
| 10,132,431 | B2 * | 11/2018 | Fujii ................... F16L 19/028 |
| 10,145,497 | B2 | 12/2018 | Fujii et al. |
| 2002/0180211 | A1 | 12/2002 | Nishio |
| 2004/0100097 | A1 * | 5/2004 | Fukano ................ F16L 47/041 |
| | | | 285/322 |
| 2016/0061357 | A1 | 3/2016 | Fujii et al. |
| 2016/0116096 | A1 | 4/2016 | Fujii et al. |
| 2017/0307118 | A1 | 10/2017 | Fujii et al. |
| 2019/0331272 | A1 | 10/2019 | Fujii et al. |

FOREIGN PATENT DOCUMENTS

| | | | | |
|---|---|---|---|---|
| JP | H05-090089 | U | 12/1993 | |
| JP | 08254291 | A * | 10/1996 | ............. F16L 47/04 |
| JP | H08-254291 | A | 10/1996 | |
| JP | 2002-357294 | A | 12/2002 | |
| JP | 2003-254475 | A | 9/2003 | |
| JP | 2011190832 | A | 9/2011 | |
| JP | 2014-219051 | A | 11/2014 | |
| JP | 2014-219060 | A | 11/2014 | |
| JP | 2018-168947 | A | 11/2018 | |

OTHER PUBLICATIONS

Written Opinion issued in corresponding International Application No. PCT/JP2021/036665 issued Dec. 7, 2021 (4 pages).

* cited by examiner

ONE SIDE ← (AXIAL DIRECTION) → OTHER SIDE (AXIAL DIRECTION)

ONE SIDE ←——————→ OTHER SIDE

ONE SIDE ◀━ (AXIAL DIRECTION) ━▶ OTHER SIDE

PIPE JOINT

CROSS-REFERENCE TO RELATED APPLICATIONS

This is a divisional application of U.S. patent application Ser. No. 18/258,813, filed Jun. 22, 2023, which is a national stage application of International Patent Application No. PCT/JP2021/036665, filed Oct. 4, 2021, which claims priority to Japanese Patent Application No. 2021-024153, filed Feb. 18, 2021. The contents of these priority applications are incorporated herein by reference.

TECHNICAL FIELD

The present invention relates to a pipe joint.

BACKGROUND ART

In manufacturing processes in various technical fields such as semiconductor manufacturing, medical/pharmaceutical manufacturing, and food processing/chemical industries, in a pipe path through which fluids such as chemical solutions, high-purity liquids, ultrapure water, or cleaning solutions flow, for example, a pipe joint made of a synthetic resin is used as a connection structure that connects flow passages formed in tubes or fluid devices. As such a pipe joint, a pipe joint that includes an inner ring mounted on the inner circumferential side of an end portion of a tube, a cylindrical joint body mounted on the outer circumferential side of the end portion of the tube, and a union nut mounted on the outer circumferential side of the joint body, is known (see, for example, PATENT LITERATURE 1).

The inner ring has a cylindrical body portion, a bulge portion formed at one axial end portion of the body portion so as to project toward a radially outer side, and a sealing portion formed at another axial end portion of the body portion. A fluid flow passage is formed inside the inner ring. The bulge portion of the inner ring is press-fitted into the end portion of the tube to increase the diameter of the end portion of the tube. The union nut presses the outer circumferential surface of the tube whose diameter has been increased by the bulge portion of the inner ring, by the thrust force of the union nut when the union nut is attached to the joint body. Accordingly, the sealing portion of the inner ring is pressed into a sealing groove formed on the joint body, and coming-out of the tube can also be prevented. Furthermore, a surface pressure is generated between the tube and the bulge portion, so that a fluid can be inhibited from leaking from between the tube and the bulge portion.

CITATION LIST

Patent Literature

PATENT LITERATURE 1: Japanese Laid-Open Patent Publication No. 2018-168947

SUMMARY OF THE INVENTION

Technical Problem

When the tube is pressed by the thrust force of the union nut, the inner circumferential surface of the tube comes into contact with the outer circumferential surface of the bulge portion of the inner ring over a wide axial range, so that the range where the surface pressure is generated between the tube and the bulge portion extends over a wide axial range. Therefore, in order to ensure the surface pressure required to inhibit fluid leakage, between the tube and the bulge portion, it is necessary to increase the tightening torque of the union nut, resulting in a problem of poor workability.

The present invention has been made in view of such circumstances, and an object of the present invention is to provide a pipe joint that can ensure a required surface pressure between a bulge portion of an inner ring and a tube even if the tightening torque of a union nut is not increased.

Solution to Problem (1) A pipe joint of the present invention includes: an inner ring having a bulge portion formed on one axial side so as to project toward a radially outer side, the bulge portion being for press-fitting into an end portion of a tube; a joint body having an inner circumference into which an end portion on another axial side of the inner ring is to be press-fitted in a state where the bulge portion is press-fitted into the end portion of the tube, the joint body having an external thread portion on an outer circumference thereof; and a union nut having an internal thread portion to be tightened to the external thread portion, and configured to press the end portion of the tube toward the other axial side when the internal thread portion is tightened to the external thread portion, wherein the bulge portion has a tapered portion formed so as to be tapered from a middle portion in an axial direction thereof toward the one axial side and configured to generate a surface pressure between the tube and the tapered portion by pressing by the union nut, and an outer circumferential surface of the tapered portion has a concave surface portion formed in a concave surface shape in an axial cross-sectional view.

In the pipe joint of the present invention, since the concave surface portion is formed in the outer circumferential surface of the tapered portion in the bulge portion of the inner ring, when the union nut presses the tube, the tube is less likely to come into contact with a bottom portion of the concave surface portion. Accordingly, the axial range where the surface pressure is generated between the tapered portion of the bulge portion and the tube is narrower than that in the conventional art, so that the surface pressure generated between the tapered portion of the bulge portion and the tube can be made larger than that in the conventional art. Therefore, even if the tightening torque of the union nut is not increased, the required surface pressure can be ensured between the bulge portion of the inner ring and the tube. As a result, a fluid can be inhibited from leaking from between the bulge portion and the tube to the outside.

(2) Preferably, the concave surface portion is formed over an entire axial length of the outer circumferential surface of the tapered portion.

In this case, the axial range where the surface pressure is generated between the tapered portion of the bulge portion and the tube can be made further narrower, so that the surface pressure generated between the tapered portion of the bulge portion and the tube can be further increased.

(3) Preferably, the outer circumferential surface of the tapered portion has a convex surface portion formed in a convex surface shape on the one axial side with respect to the concave surface portion in the axial cross-sectional view.

In this case, compared to the case of the above (2), the thickness in the radial direction of an end portion on the one axial side can be larger than the concave surface portion in the tapered portion. Accordingly, the strength of the end portion of the tapered portion is increased, so that, even when the tapered portion is pressed via the tube by the union nut, the end portion of the tapered portion can be inhibited from falling down toward the radially inner side. As a result, the flow of the fluid in the inner ring can be inhibited from being obstructed by the tapered portion of the bulge portion.

(4) A pipe joint according to another aspect of the present invention includes: an inner ring having a bulge portion formed on one axial side so as to project toward a radially outer side, the bulge portion being for press-fitting into an end portion of a tube; a joint body having an inner circumference into which an end portion on another axial side of the inner ring is to be press-fitted in a state where the bulge portion is press-fitted into the end portion of the tube, the joint body having an external thread portion on an outer circumference thereof; and a union nut having an internal thread portion to be tightened to the external thread portion, and configured to press the end portion of the tube toward the other axial side when the internal thread portion is tightened to the external thread portion, wherein the bulge portion has a tapered portion formed so as to be tapered from a middle portion in an axial direction thereof toward the one axial side and configured to generate a surface pressure between the tube and the tapered portion by pressing by the union nut, and a diameter D of one axial end of an outer circumferential surface of the tapered portion and an inner diameter d of a non-deformed portion, of the tube, that does not become deformed even when the bulge portion is press-fitted satisfy a relationship of $1.0d \leq D \leq 1.4d$.

In the pipe joint of the present invention, since the diameter D of the one axial end of the outer circumferential surface of the tapered portion in the bulge portion of the inner ring and the inner diameter d of the non-deformed portion of the tube satisfy the relationship of $D \leq 1.4d$, the tightening torque of the union nut is not increased. In addition, since the diameter D of the one axial end of the outer circumferential surface of the tapered portion and the inner diameter d of the non-deformed portion of the tube satisfy the relationship of $1.0d \leq D$, even if the tightening torque of the union nut is not increased, the required surface pressure can be ensured between the bulge portion of the inner ring and the tube. As a result, a fluid can be inhibited from leaking from between the bulge portion and the tube to the outside.

Advantageous Effects of the Invention

According to the present invention, it is possible to ensure the required surface pressure between the bulge portion of the inner ring and the tube even if the tightening torque of the union nut is not increased.

DETAILED DESCRIPTION

Next, preferred embodiments of the present invention will be described with reference to the accompanying drawings.

First Embodiment

Figure 1:
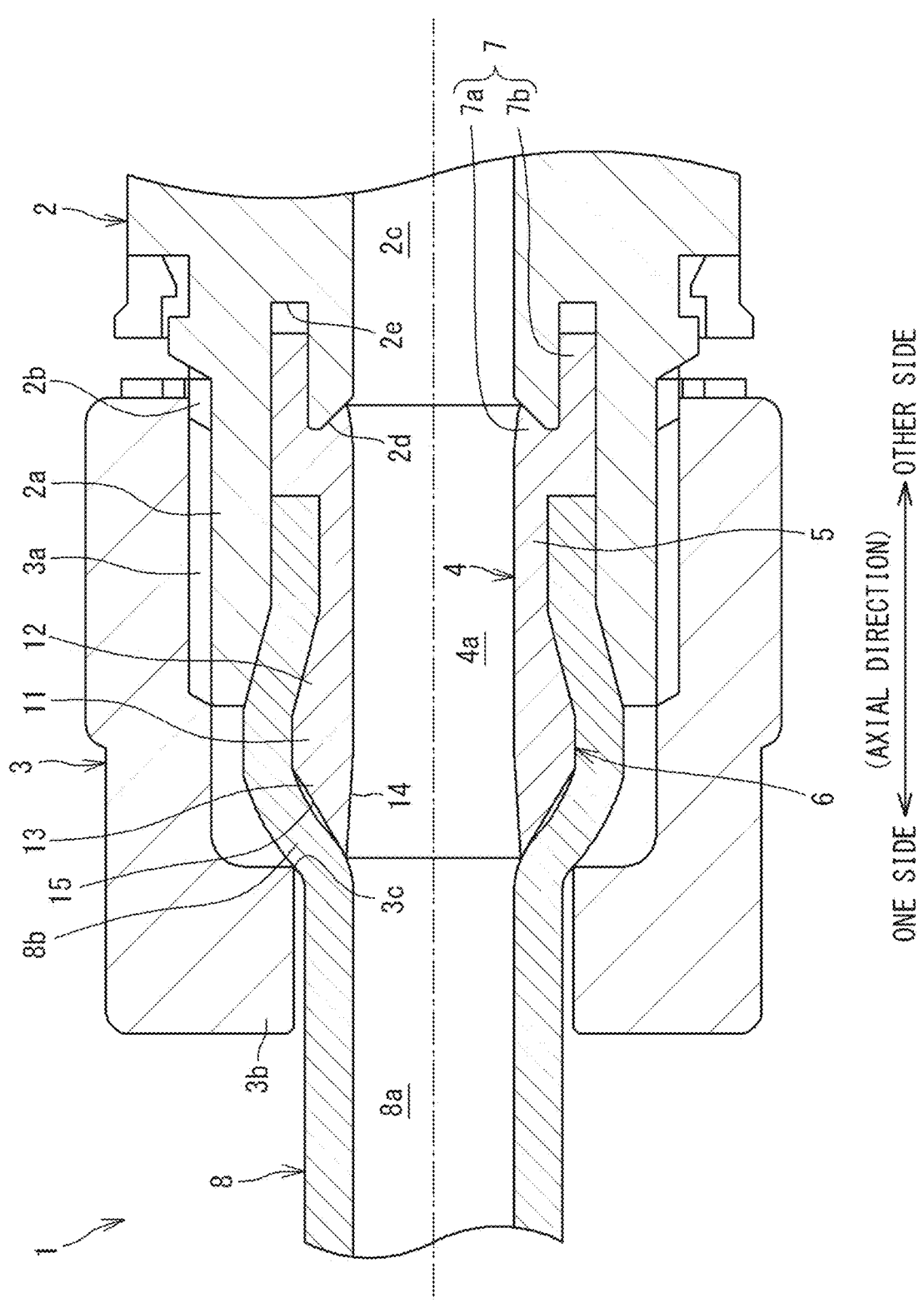
FIG. 1 is an axial cross-sectional view of a pipe joint according to a first embodiment of the present invention.

FIG. 1 is an axial cross-sectional view showing a pipe joint according to a first embodiment of the present invention. In FIG. 1, a pipe joint 1 is used, for example, in a pipe path through which a chemical solution (fluid) used in a semiconductor manufacturing apparatus flows. The pipe joint 1 includes a joint body 2, a union nut 3, and an inner ring 4. Hereinafter, in the present embodiment, for convenience, the left side of FIG. 1 is referred to as one axial side, and the right side of FIG. 1 is referred to as another axial side (the same applies to FIG. 2 to FIG. 9).

The inner ring 4 is formed in a cylindrical shape, for example, from a synthetic resin material such as polyvinyl chloride (PVC), polypropylene (PP), polyethylene (PE), or a fluorine resin (perfluoroalkoxy alkane (PFA), polytetrafluoroethylene (PTFE), polyvinylidene fluoride (PVDF), or the like).

The inner ring 4 includes a body portion 5 formed in a cylindrical shape, a bulge portion 6 formed on the one axial side of the body portion 5, and a sealing portion 7 formed on the other axial side of the body portion 5. A fluid flow passage 4a is formed on the radially inner side of each of the body portion 5, the bulge portion 6, and the sealing portion 7 in the inner ring 4. The fluid flow passage 4a provides communication between a flow passage 8a formed inside a tube 8 and a flow passage 2c formed inside the joint body 2.

The bulge portion 6 is formed on the one axial side of the body portion 5 so as to project toward the radially outer side. The bulge portion 6 is press-fitted into an end portion of the tube 8, which is made of a synthetic resin material (PFA or the like), to increase the diameter of the end portion of the tube 8. The bulge portion 6 will be described in detail later. The sealing portion 7 has an annular primary sealing portion 7a and a cylindrical secondary sealing portion 7b.

The primary sealing portion 7a is formed so as to project from the radially inner side of another axial end portion of the body portion 5 toward the other axial side. The outer circumferential surface of the primary sealing portion 7a is formed such that the diameter thereof gradually decreases from one axial end thereof toward another axial end thereof. The primary sealing portion 7a is press-fitted into a primary sealing groove 2d (described later) of the joint body 2. The secondary sealing portion 7b is formed so as to project from the radially outer side of the other axial end portion of the body portion 5 toward the other axial side. The secondary sealing portion 7b is press-fitted into a secondary sealing groove 2e (described later) of the joint body 2.

The joint body 2 is formed in a cylindrical shape, for example, from a synthetic resin material such as PVC, PP, PE, or a fluorine resin (PFA, PTFE, or the like). The inner diameter of the joint body 2 is set to substantially the same dimension as the inner diameter of the inner ring 4 such that the movement of the chemical solution is not hindered. A receiving portion 2a is formed at one axial end portion of the joint body 2. The sealing portion 7 of the inner ring 4 in which the bulge portion 6 is press-fitted (at an end portion on the other axial side thereof) into the end portion of the tube 8 is press-fitted to the inner circumference of the receiving portion 2a. Accordingly, the one axial end portion of the joint body 2 is mounted on the outer circumference of the end portion of the tube 8. An external thread portion 2b is formed on the outer circumference of the receiving portion 2a.

The joint body 2 has the annular primary sealing groove 2d and the annular secondary sealing groove 2e which are formed on the radially inner side with respect to the receiving portion 2a. The primary sealing groove 2d is formed on the radially inner side of the joint body 2 in a tapered shape that is cut such that the diameter thereof gradually decreases from the one axial end thereof toward the other axial end thereof. The secondary sealing groove 2e is formed on the radially outer side with respect to the primary sealing groove 2d in the joint body 2.

The union nut 3 is formed in a cylindrical shape, for example, from a synthetic resin material such as PVC, PP, PE, or a fluorine resin (PFA, PTFE, or the like). The union nut 3 has an internal thread portion 3a formed on the inner circumference on the other axial side thereof, and a pressing portion 3b formed on the one axial side thereof so as to project toward the radially inner side.

The internal thread portion 3a of the union nut 3 is tightened to the external thread portion 2b of the joint body 2. By the tightening, the union nut 3 is attached to the joint body 2, and a corner portion 3c formed at another axial end portion of the pressing portion 3b presses a diameter-increased portion 8b of the tube 8 whose diameter has been increased by the bulge portion 6 of the inner ring 4. In the present embodiment, the portion, of the pressing portion 3b, that presses the tube 8 is not limited to the corner portion 3c. For example, a chamfered portion may be formed at the other axial end portion of the pressing portion 3b instead of the corner portion 3c, and the tube 8 may be pressed by the chamfered portion.

With the above configuration, when the internal thread portion 3a of the union nut 3 is tightened to the external thread portion 2b of the joint body 2, the primary sealing portion 7a and the secondary sealing portion 7b of the inner ring 4 are press-fitted into the primary sealing groove 2d and the secondary sealing groove 2e of the joint body 2, respectively. Accordingly, sealing performance at the connection portion between the inner ring 4 and the joint body 2 can be ensured. In addition, the corner portion 3c of the union nut 3 can prevent coming-out of the tube 8 by pressing the diameter-increased portion 8b of the tube 8 toward the other axial side.

Figure 2:
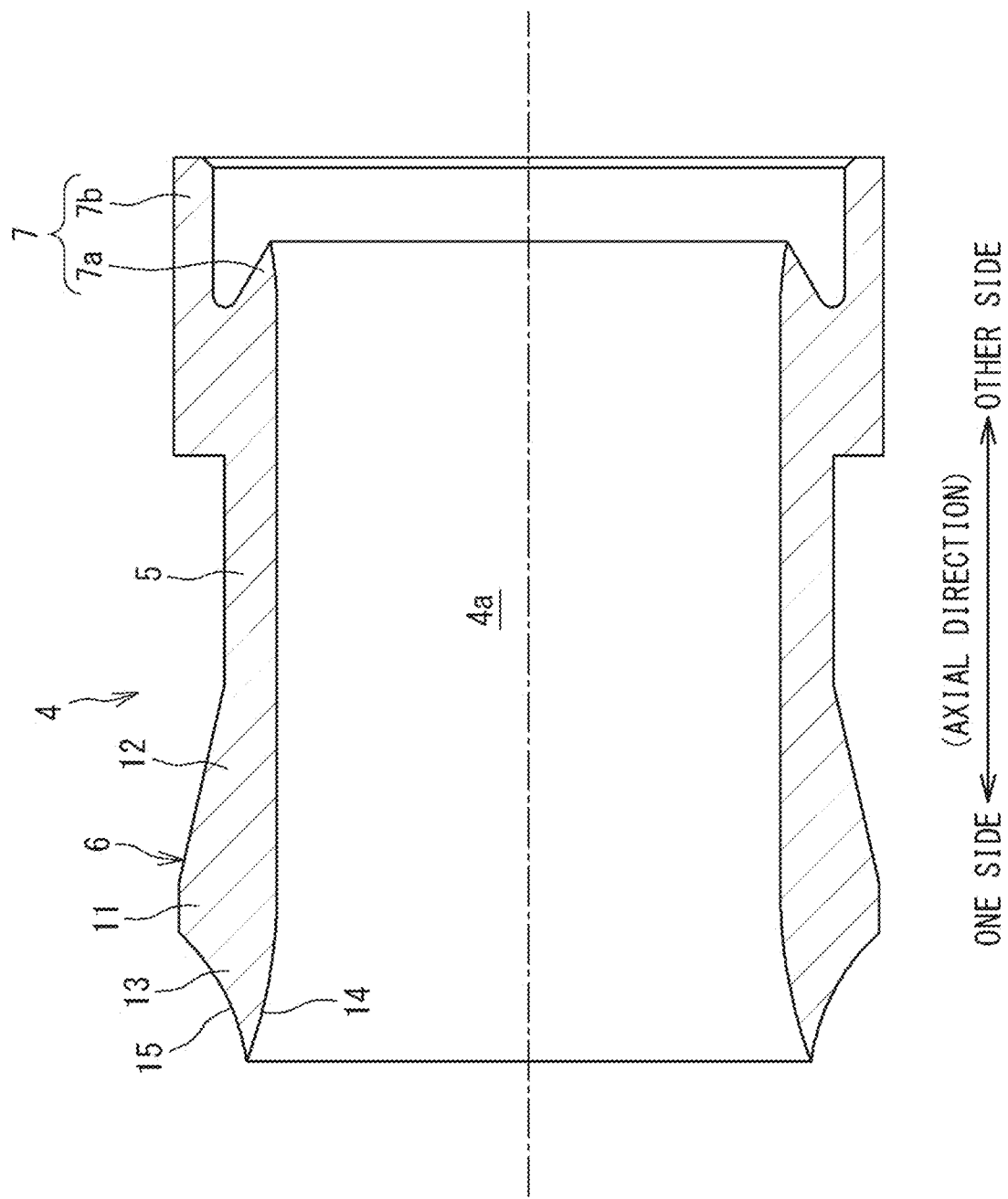
FIG. 2 is an axial cross-sectional view showing an inner ring of the pipe joint.

FIG. 2 is an axial cross-sectional view of the inner ring 4. In FIG. 1 and FIG. 2, the bulge portion 6 of the inner ring 4 has a maximum thickness portion 11 in which the thickness in the radial direction thereof is maximum, a proximal end portion 12 formed on the other axial side of the maximum thickness portion 11, and a tapered portion 13 formed on the one axial side of the maximum thickness portion 11.

The maximum thickness portion 11 is formed over a predetermined length in the axial direction. The outer circumferential surface of the proximal end portion 12 is formed such that the diameter thereof gradually decreases from another axial end of the maximum thickness portion 11 toward the other axial side. Accordingly, the proximal end portion 12 is formed such that the thickness in the radial direction thereof gradually decreases from the other axial end of the maximum thickness portion 11 toward the other axial side. Another axial end of the proximal end portion 12 is connected to the body portion 5. In the cross-sectional view of FIG. 2, the outer circumferential surface of the proximal end portion 12 is inclined in a flat surface shape, but may be inclined in a curved surface shape.

An inner circumferential surface 14 of the tapered portion 13 is formed such that the diameter thereof gradually increases from the other axial side toward one axial end thereof. An outer circumferential surface 15 of the tapered portion 13 is formed such that the diameter thereof gradually decreases from one axial end of the maximum thickness portion 11 toward the one axial side. Accordingly, the tapered portion 13 is formed such that the thickness in the radial direction thereof gradually decreases, that is, the tapered portion 13 is tapered, from a middle portion in the axial direction of the bulge portion 6 toward the one axial side. Between the outer circumferential surface 15 of the tapered portion 13 and the inner circumferential surface of the diameter-increased portion 8b of the tube 8, a surface pressure is generated by the corner portion 3c of the union nut 3 pressing the diameter-increased portion 8b.

Figure 3:
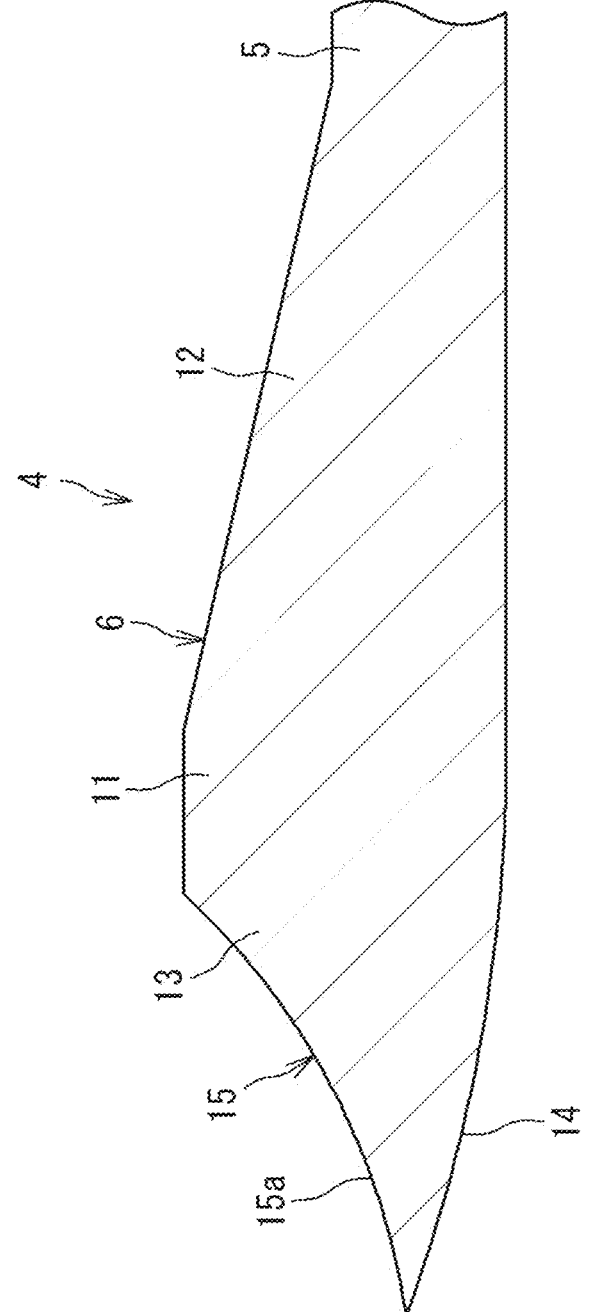
FIG. 3 is an enlarged cross-sectional view of a main part of FIG. 2, showing a bulge portion of the inner ring.

FIG. 3 is an enlarged cross-sectional view of a main part of FIG. 2, showing the bulge portion 6 of the inner ring 4. The outer circumferential surface 15 of the tapered portion 13 of the bulge portion 6 has a concave surface portion 15a which is formed in a concave surface shape so as to be recessed radially inward. The concave surface portion 15a is formed, for example, in a concave arc shape. The concave surface portion 15a of the present embodiment is formed over the entire axial length of the outer circumferential surface 15 of the tapered portion 13.

Figure 4:
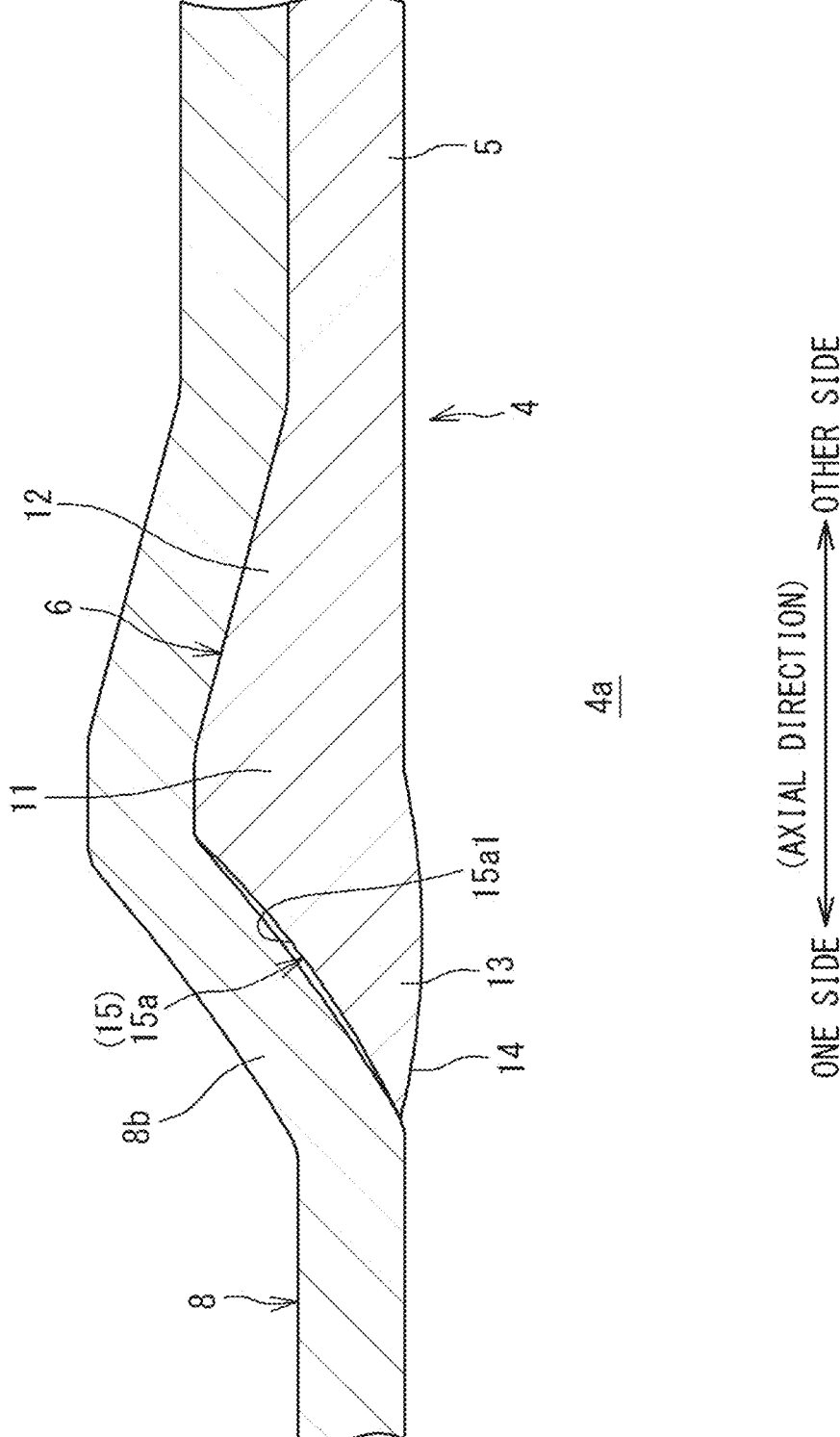
FIG. 4 is a cross-sectional view showing a contact state between a tapered portion of the bulge portion and a tube.

As described above, since the concave surface portion 15a is formed in the outer circumferential surface 15 of the tapered portion 13 in the bulge portion 6 of the inner ring 4, when the diameter-increased portion 8b of the tube 8 is pressed toward the other axial side by the union nut 3 (not shown) as shown in FIG. 4, the inner circumferential surface of the tube 8 is less likely to come into contact with a bottom portion 15al of the concave surface portion 15a. Accordingly, the axial range where the surface pressure is generated between the tapered portion 13 of the bulge portion 6 and the tube 8 is narrower than that in the conventional art, so that the surface pressure generated between the tapered portion 13 of the bulge portion 6 and the tube 8 can be made larger than that in the conventional art. Therefore, even if the tightening torque of the union nut 3 is not increased, the required surface pressure can be ensured between the bulge portion 6 of the inner ring 4 and the tube 8. As a result, the chemical solution flowing through the fluid flow passage 4a of the inner ring 4 can be inhibited from leaking from between the bulge portion 6 and the tube 8 to the outside.

Since the concave surface portion 15a is formed over the entire axial length of the outer circumferential surface 15 of the tapered portion 13, the axial range where the surface pressure is generated between the tapered portion 13 of the bulge portion 6 and the tube 8 can be further narrower than that in the case where the concave surface portion 15a is formed in only a part in the axial direction of the outer circumferential surface 15 of the tapered portion 13. Accordingly, the surface pressure generated between the tapered portion 13 of the bulge portion 6 and the tube 8 can be further increased.

Figure 5:
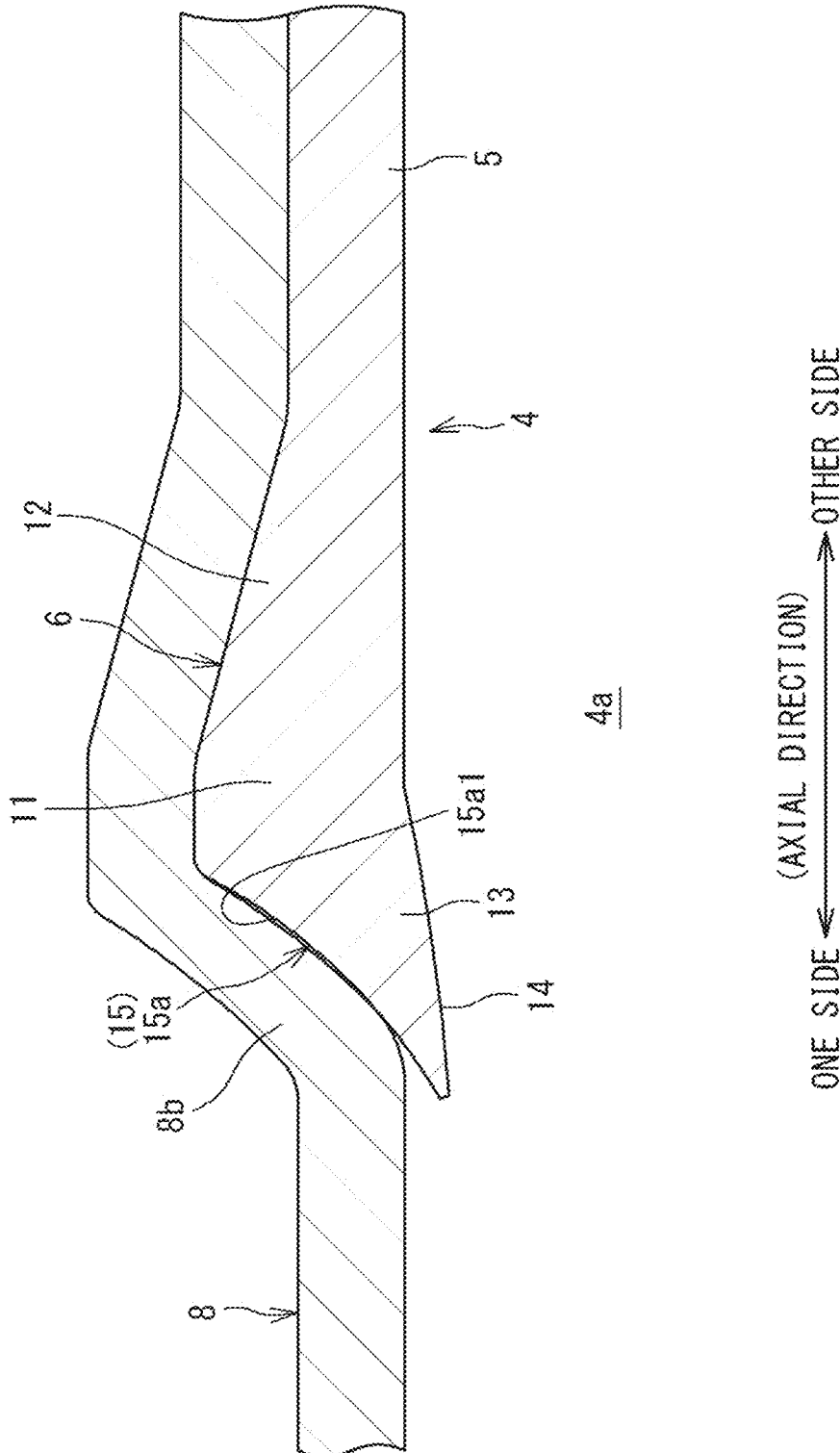
FIG. 5 is a cross-sectional view showing a state where the tapered portion of the bulge portion has fallen down toward the radially inner side.

Meanwhile, in the present embodiment, since the thickness in the radial direction of a distal end portion (one axial end portion) of the tapered portion 13 is small, when the tapered portion 13 is pressed via the tube 8 by the union nut 3, the distal end portion of the tapered portion 13 easily falls down toward the radially inner side (fluid flow passage 4*a* side) as shown in FIG. 5, so that the tube 8 and the inner circumferential surface 14 do not become flush with each other. When the distal end portion of the tapered portion 13 falls down as described above, the flow of the chemical solution in the fluid flow passage 4*a* of the inner ring 4 may be obstructed by the distal end portion of the tapered portion 13. Therefore, in a second embodiment described below, a configuration for inhibiting the distal end portion of the tapered portion 13 from falling down is provided.

Second Embodiment

Figure 6:
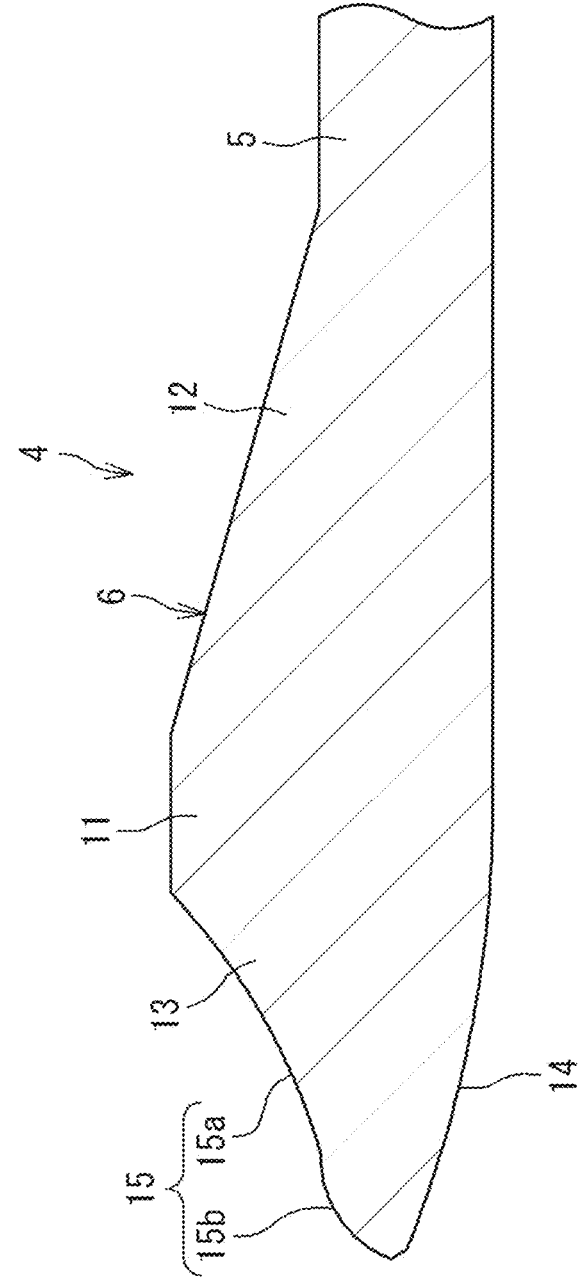
FIG. 6 is an enlarged axial cross-sectional view showing a bulge portion of an inner ring in a pipe joint according to a second embodiment of the present invention.

FIG. 6 is an enlarged axial cross-sectional view showing a bulge portion 6 of an inner ring 4 in a pipe joint 1 according to the second embodiment of the present invention. In the second embodiment, the shape of an outer circumferential surface 15 of a tapered portion 13 of the bulge portion 6 is different from that of the first embodiment. The difference will be described below.

The outer circumferential surface 15 of the tapered portion 13 of the bulge portion 6 has a concave surface portion 15*a* which is formed in a concave surface shape so as to be recessed radially inward, and a convex surface portion 15*b* which is formed in a convex surface shape on the one axial side with respect to the concave surface portion 15*a* so as to project toward the radially outer side. The concave surface portion 15*a* is formed, for example, in a concave arc shape. The convex surface portion 15*b* is formed, for example, in a convex arc shape.

The concave surface portion 15*a* is formed between another axial end and a middle portion on the one axial side of the outer circumferential surface 15. The convex surface portion 15*b* is formed between the middle portion and one axial end of the outer circumferential surface 15. Accordingly, in the outer circumferential surface 15 of the tapered portion 13, the concave surface portion 15*a* and the convex surface portion 15*b* are formed so as to be continuous in the axial direction, and the convex surface portion 15*b* is formed at a distal end portion of the tapered portion 13. The other components of the second embodiment are the same as those of the first embodiment, and thus are designated by the same reference signs, and the description thereof is omitted.

Figure 7:
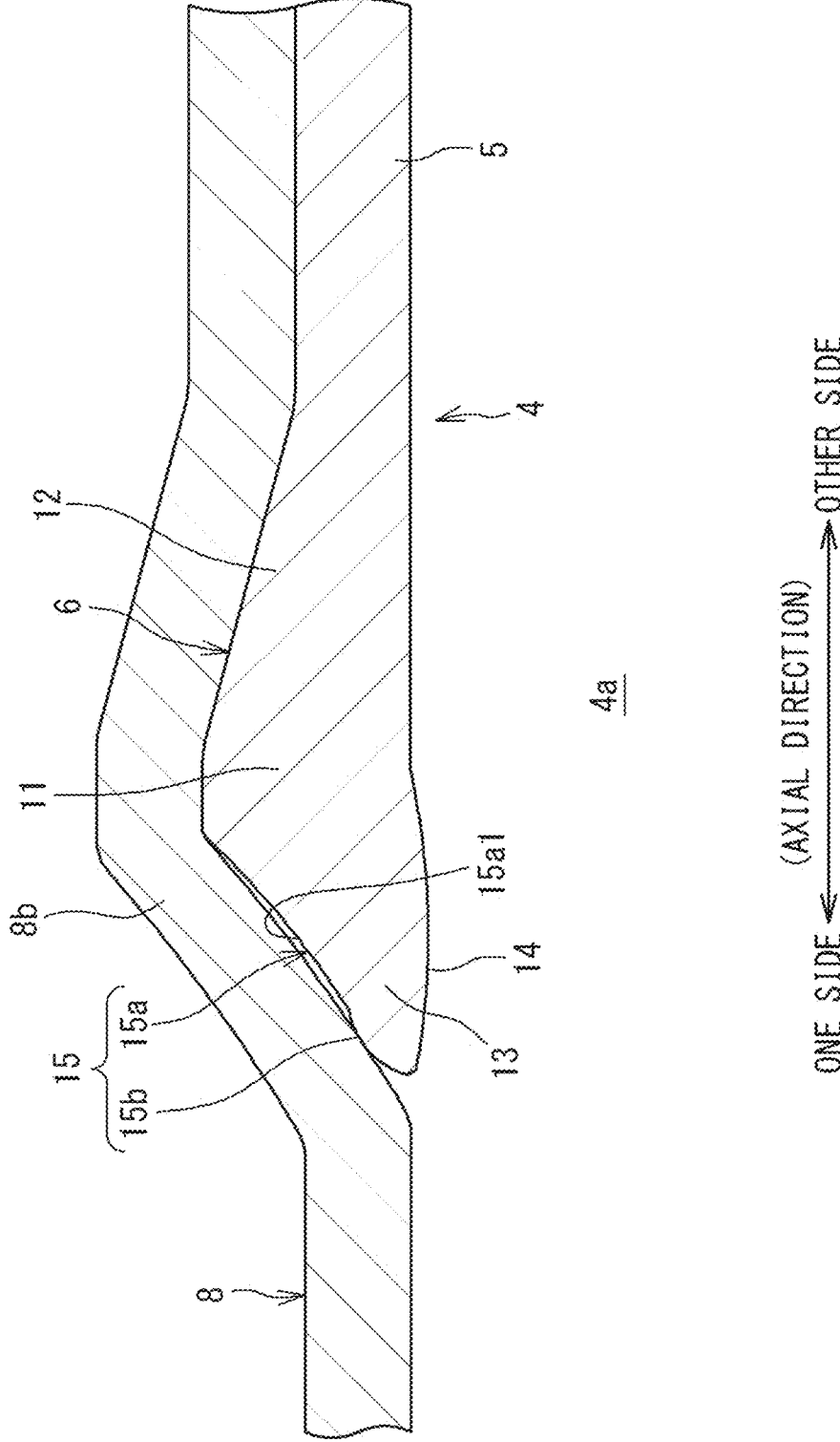
FIG. 7 is a cross-sectional view showing a contact state between a tapered portion of the bulge portion and a tube in the second embodiment.

Thus, in the pipe joint 1 of the second embodiment as well, since the concave surface portion 15*a* is formed in the outer circumferential surface 15 of the tapered portion 13 in the bulge portion 6 of the inner ring 4, when the diameter-increased portion 8*b* of the tube 8 is pressed toward the other axial side by the union nut 3 (not shown) as shown in FIG. 7, the inner circumferential surface of the tube 8 is less likely to come into contact with a bottom portion 15*al* of the concave surface portion 15*a*. Accordingly, the axial range where the surface pressure is generated between the tapered portion 13 of the bulge portion 6 and the tube 8 is narrower than that in the conventional art, so that the surface pressure generated between the tapered portion 13 of the bulge portion 6 and the tube 8 can be made larger than that in the conventional art. Therefore, even if the tightening torque of the union nut 3 is not increased, the required surface pressure can be ensured between the bulge portion 6 of the inner ring 4 and the tube 8. As a result, the chemical solution flowing through the fluid flow passage 4*a* of the inner ring

4 can be inhibited from leaking from between the bulge portion 6 and the tube 8 to the outside.

Since the convex surface portion 15*b* is formed on the one axial side with respect to the concave surface portion 15*a* in the outer circumferential surface 15 of the tapered portion 13, the thickness in the radial direction of the distal end portion of the tapered portion 13 can be larger than that in the first embodiment. Accordingly, the strength of the distal end portion of the tapered portion 13 is increased, so that, even when the tapered portion 13 is pressed via the tube 8 by the union nut 3, the distal end portion of the tapered portion 13 can be inhibited from significantly falling down toward the radially inner side as in the first embodiment (see FIG. 5). As a result, the flow of the chemical solution in the fluid flow passage 4*a* of the inner ring 4 can be inhibited from being obstructed by the tapered portion 13 of the bulge portion 6.

Third Embodiment

Figure 8:
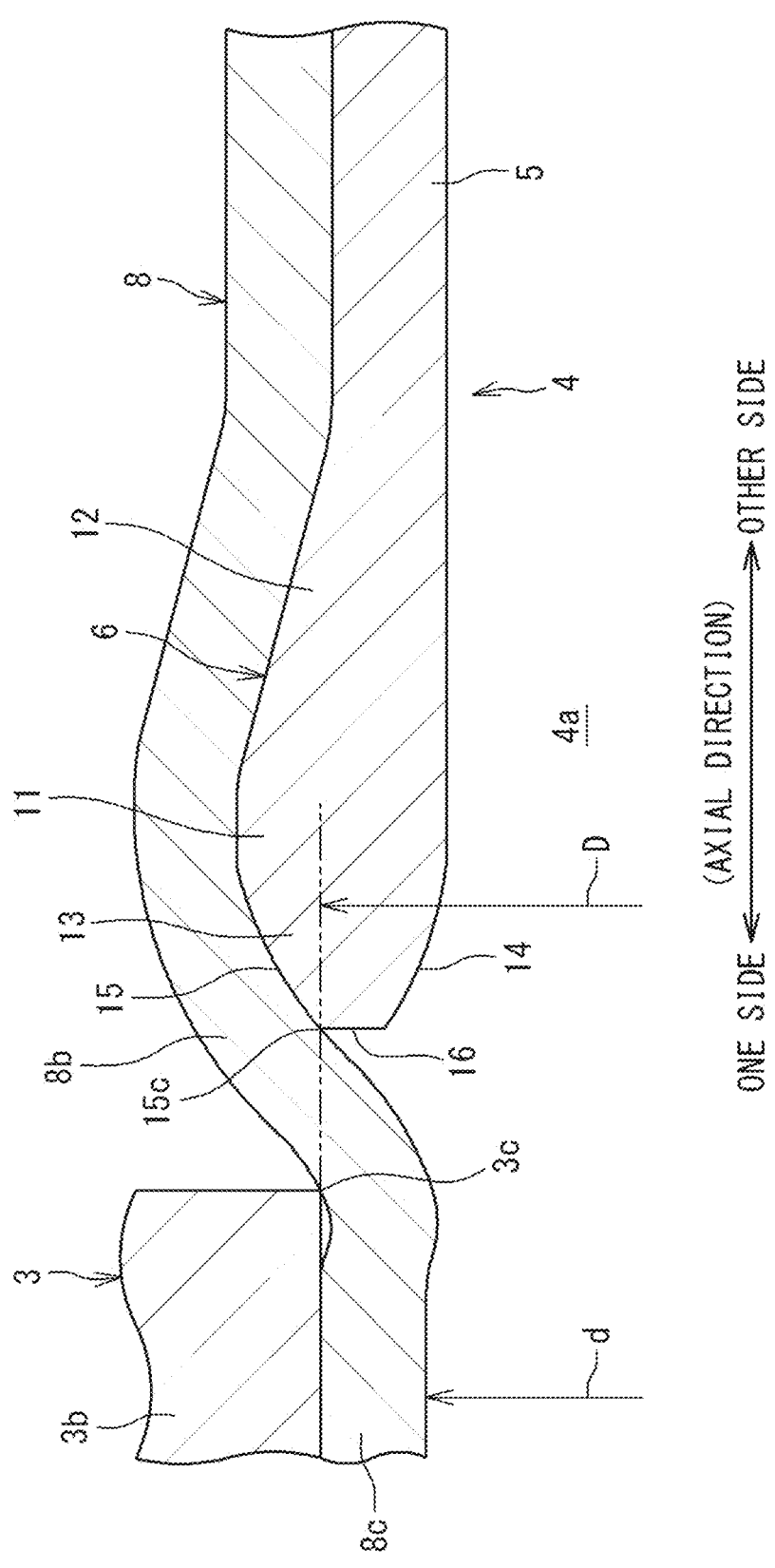
FIG. 8 is an enlarged axial cross-sectional view showing an area around a bulge portion of an inner ring in a pipe joint according to a third embodiment of the present invention.

FIG. 8 is an enlarged axial cross-sectional view showing an area around a bulge portion 6 of an inner ring 4 in a pipe joint 1 according to a third embodiment of the present invention. In the third embodiment, the shape of a tapered portion 13 of the bulge portion 6 is different from that of the first embodiment. The difference will be described below.

The tapered portion 13 of the bulge portion 6 is formed so as to be shorter in the axial direction than the tapered portion 13 of the bulge portion 6 in the first embodiment. A flat surface 16 is formed at one axial end of the tapered portion 13 so as to extend in the radial direction. The flat surface 16 extends from one axial end 15*c* of an outer circumferential surface 15 of the tapered portion 13 toward the radially inner side, and is connected to one axial end of an inner circumferential surface 14 of the tapered portion 13.

The outer circumferential surface 15 of the tapered portion 13 is formed in a convex surface shape (e.g., a convex arc shape) over the entire axial length thereof. A diameter D of the one axial end 15*c* of the outer circumferential surface 15 of the tapered portion 13 and an inner diameter d of a non-deformed portion 8*c* of a tube 8 are set so as to satisfy a relationship of $1.0d \leq D \leq 1.4d$. The non-deformed portion 8*c* is a portion, of the tube 8, that does not become deformed even when the bulge portion 6 of the inner ring 4 is press-fitted into an end portion of the tube 8.

The reason why $D \leq 1.4d$ is satisfied is that, if the diameter D of the one axial end 15*c* exceeds 1.4d, a pressing force is generated in the axial direction by a corner portion 3*c* of a union nut 3 over the entirety of the flat surface 16, and thus the tightening torque of the union nut 3 is increased. The reason why $1.0d \leq D$ is satisfied is that, if the diameter D of the one axial end 15*c* is less than 1.0d, the axial range where a surface pressure is generated between the tapered portion 13 of the bulge portion 6 and the tube 8 is longer, so that a required surface pressure cannot be ensured between the bulge portion 6 and the tube 8. The other components of the third embodiment are the same as those of the first embodiment, and thus are designated by the same reference signs, and the description thereof is omitted.

The flat surface 16 is formed at the one axial end of the tapered portion 13, but a shape (e.g., a tapered surface or the like) other than a flat surface may be formed thereat.

Figure 9:
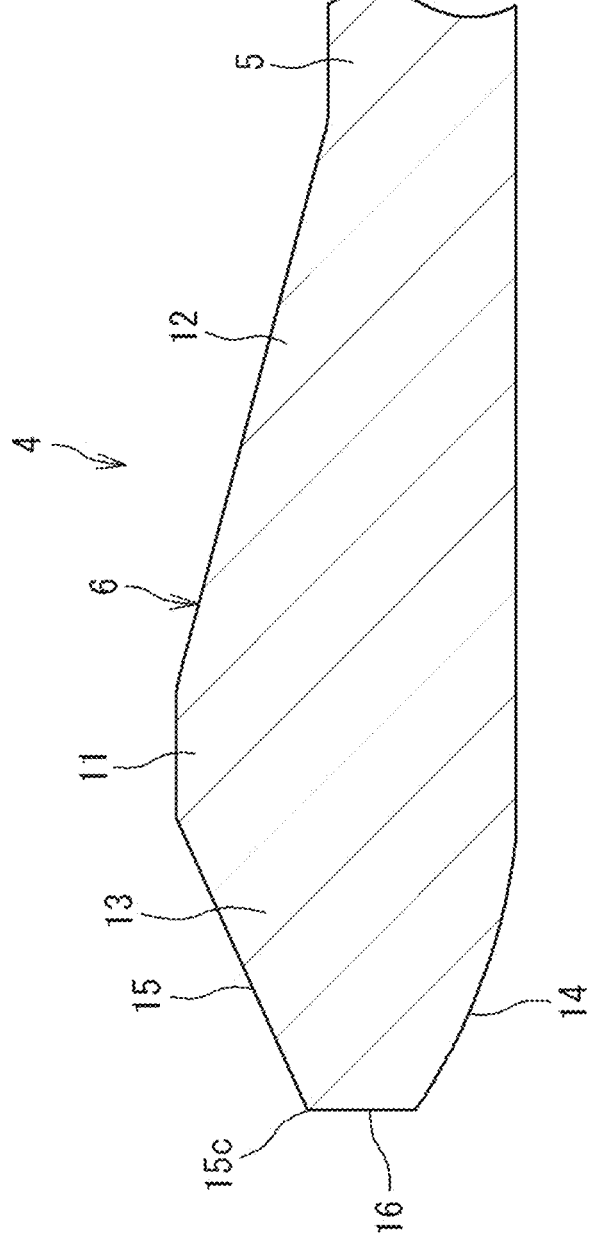
FIG. 9 is an enlarged axial cross-sectional view showing a modification of the bulge portion of the inner ring in the third embodiment.

The shape of the outer circumferential surface 15 of the tapered portion 13 is not limited to the convex surface shape, and may be formed, for example, as a flat surface shape as shown in FIG. 9.

As described above, in the pipe joint 1 of the third embodiment, since the diameter D of the one axial end 15*c* of the outer circumferential surface 15 of the tapered portion 13 in the bulge portion 6 of the inner ring 4 and the inner diameter d of the non-deformed portion 8*c* of the tube 8 satisfy the relationship of D≤1.4d, the tightening torque of the union nut 3 is not increased. In addition, since the diameter D of the one axial end 15*c* of the outer circumferential surface 15 of the tapered portion 13 and the inner diameter d of the non-deformed portion 8*c* of the tube 8 satisfy the relationship of 1.0d≤D, even if the tightening torque of the union nut 3 is not increased, the required surface pressure can be ensured between the bulge portion 6 of the inner ring 4 and the tube 8. As a result, the chemical solution flowing through the fluid flow passage 4*a* of the inner ring 4 can be inhibited from leaking from between the bulge portion 6 and the tube 8 to the outside.

Others

The pipe joint of the present invention can also be applied to the liquid crystal/organic EL field, the medical/pharmaceutical field, automotive-related fields, etc., in addition to a semiconductor manufacturing apparatus.

The embodiments disclosed herein are merely illustrative in all aspects and should not be recognized as being restrictive. The scope of the present invention is defined by the scope of the claims rather than the meaning described above, and is intended to include meaning equivalent to the scope of the claims and all modifications within the scope.

REFERENCE SIGNS LIST

1 pipe joint
2 joint body
2*b* external thread portion
3 union nut
3*a* internal thread portion
3*c* corner portion
4 inner ring
6 bulge portion
8 tube
8*c* non-deformed portion
13 tapered portion

15 outer circumferential surface
15*a* concave surface portion
15*b* convex surface portion
15*c* one axial end

What is claimed is:

1. A pipe joint comprising:
an inner ring having a bulge portion formed on a first axial side so as to project radially outward, the bulge portion being for press-fitting into an end portion of a tube;
a joint body having an inner circumference into which an end on a second axial side of the inner ring is to be press-fitted in a state where the bulge portion is press-fitted into the end portion of the tube, the joint body having an external thread on an outer circumference thereof; and
a union nut having an internal thread to be tightened to the external thread, and configured to press the end portion of the tube toward the second axial side when the internal thread is tightened to the external thread, wherein
the bulge portion has:
a maximum thickness portion in which a thickness in a radial direction thereof is maximum; and
a tapered portion formed so as to be tapered from the maximum thickness portion toward the first axial side of the inner ring and configured to generate a surface pressure between the tube and the tapered portion by pressing by the union nut,
in an axial cross-sectional view, an outer circumferential surface of the tapered portion has:
a concave surface portion formed in a concave surface shape; and
a convex surface portion formed in a convex surface shape on the first axial side with respect to the concave surface portion in the axial cross-sectional view,
the convex surface portion is formed at an end portion of the tapered portion toward the first axial side of the inner ring, and
the concave surface portion is gradually recessed radially inward from an axial end of the maximum thickness portion to an axial end of the convex surface portion.

\* \* \* \* \*